UNITED STATES PATENT OFFICE.

HANS KUZEL, OF BADEN, NEAR VIENNA, AUSTRIA-HUNGARY, ASSIGNOR TO GENERAL ELECTRIC COMPANY, A CORPORATION OF NEW YORK.

PROCESS OF MANUFACTURING ARTICLES WITH THE USE OF COLLOIDS.

969,064.  Specification of Letters Patent.  Patented Aug. 30, 1910.

No Drawing.  Application filed March 26, 1907. Serial No. 364,733.

*To all whom it may concern:*

Be it known that I, HANS KUZEL, a subject of the Emperor of Germany, and a resident of Baden, near Vienna, Empire of Austria-Hungary, have invented certain new and useful Improvements in the Process of Manufacturing Articles with the Use of Colloids, of which the following is a specification.

My prior application of January 4th, 1905, Serial No. 239,637, discloses a process of making from plastic masses containing colloidal metals small rods, wires, etc., which are mainly designed to serve as light emitting bodies for incandescence lamps. The said process consists generally of taking metals melting at high temperatures, such as chromium, manganese, molybdenum, uranium, tungsten, vanadium, tantalium, niobium, titanium, thorium, zirconium, bringing the metals to a colloidal state, forming a filament therefrom, heating the filament and passing an electric current through the filament to convert it into the crystalloidal state. If one attempts to make by the same process objects of larger dimensions, for instance solid cylinders, balls or bodies of other forms, tubes, plates, sheets, vessels, decorations, one meets with the difficulty that the molded masses owing to their comparatively small surface do not dry uniformly and in drying become easily cracked, whereby they are caused to fall to pieces on the conversion into crystalline metals. This defect may be in part avoided by subjecting the colloidal masses before drying to high pressures, such as 20 to 200 kilograms per square centimeter. Under the action of such high pressures all the water mechanically adhering to the colloidal masses and the major part of the water held absorbed by them, as so called gel water, is eliminated, and the masses are transformed into electric conductors of high resistance, while before the said treatment they do not conduct the electric current at all, but in this state they are not yet metallically coherent as crystalline metals, but must be converted into the crystalline metals by subsequent heating to a temperature corresponding to the melting point of the materials used. The cracking of larger bodies of colloidal masses is completely avoided only by using peptisated colloidal metals, solid and insoluble in water at a temperature below 100° C.

It is well known that colloidal or pseudo solutions of all substances are coagulated by the addition thereto of an electrolyte, the coagulum so obtained being called a "gel", as contradistinguished from the solid sol, which in many cases may be obtained by cautious evaporation. The essential difference between the "gel" and the solid "sol" is that the latter may be directly dissolved again in imbibition liquid, while the gel is not directly soluble in an imbibition liquid. By subjecting such gels to a special treatment with organic or inorganic alkalies or the carbonates thereof (disclosed in my application of even date, Patent No. 899,875, September 29, 1908) the gels of the metals in question may be rendered soluble in imbibition liquids. The special treatment by which gels in general are rendered soluble in imbibition liquids is called "peptisation" or peptisating and results in the production of "peptisated" colloids. The peptisated colloids of the metals in question have a notably higher contractive agglomerating power than the nonpeptisated, that is to say, the masses made therefrom and molded have a much greater cohesion and on drying and reconversion into crystalline metals, they shrink much more uniformly and without becoming cracked or falling to pieces.

For the purposes of my invention, the refractory elements, chromium, manganese, molybdenum, uranium, tungsten, vanadium, tantalium, niobium, titanium, thorium, zirconium, boron and silicon, and also iron, nickel, cobalt, arsenic and antimony may be used, either each by itself or mixed with each other and also with colloidal lead or with pulverulent lead; to such masses also any other metal powders may be admixed, for instance copper, etc.

The above process mentioned of preparing the plastic masses and of converting the molded and dried articles is the following:—

I take a pasty colloid and as above stated preferably a peptisated colloid (sol or gel), composed of one or more elements above named and with or without the addition of one or more of the above named elements in a finely powdered state. I then bring the mass to the required consistency by kneading, cautious evaporation or in any other known or preferred manner: I then bring the plastic mass so obtained into the shape required and then, if desired, subject the articles shaped to high pressure of 20 to 200 kilograms per square centimeter, as above set forth. The articles are then cautiously dried and finally gradually heated to a temperature corresponding to the melting point of the materials used, in the absence of gases capable of attacking the same, whereby the elements are reconverted into their ordinary or crystalline state so that articles of all kinds of the said metals may be produced.

I do not claim in this case the colloidal process of making articles of metals melting at high temperatures, as that is reserved for my prior application Serial No. 239,637, before referred to.

I claim as my invention—

A process of manufacturing molded metallic articles, consisting in preparing a plastic mass containing peptisated colloids of elements, solid and insoluble in water at a temperature below 100° C., bringing such plastic mass into the desired shape, subjecting the bodies and articles thus obtained to heavy pressure, to express the liquid from the mass, drying the latter and finally heating the same to a temperature below the melting temperatures of the same in an inert environment.

In testimony whereof I have signed my name to this specification, in the presence of two subscribing witnesses.

HANS KUZEL.

Witnesses:
T. GEORGE HANDY,
ALVESTO S. HOGUE.